Jan. 7, 1964
L. R. POE
3,116,528
FASTENER
Filed April 27, 1960
2 Sheets-Sheet 1
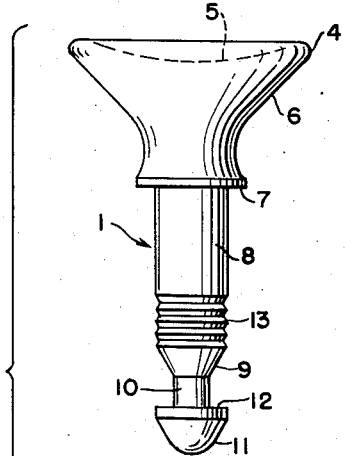
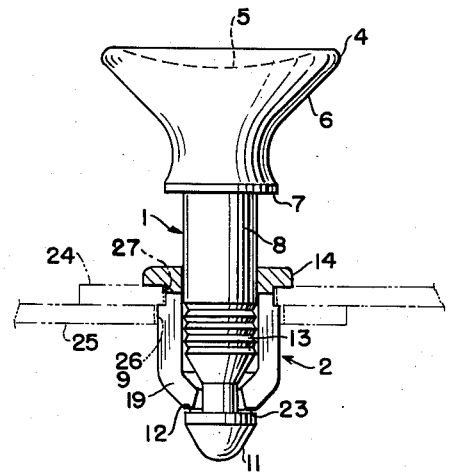
FIG. 1
FIG. 3
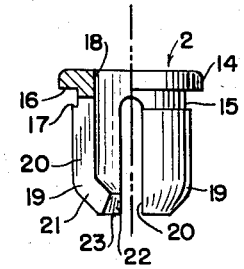
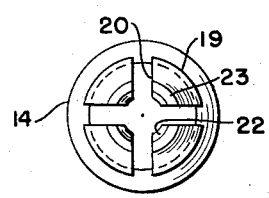
FIG. 2
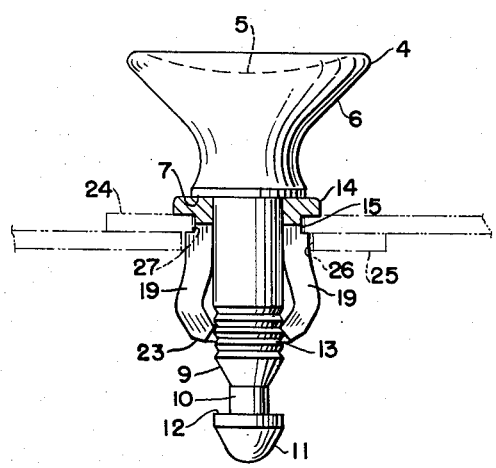
FIG. 4
*INVENTOR.*
LLOYD R. POE
BY
*Pennie, Edmonds, Morton,
Barrows & Taylor* ATTORNEYS Jan. 7, 1964 L. R. POE 3,116,528
FASTENER
Filed April 27, 1960 2 Sheets-Sheet 2

INVENTOR
LLOYD R. POE
BY
ATTORNEYS

United States Patent Office 3,116,528
Patented Jan. 7, 1964

3,116,528
FASTENER
Lloyd R. Poe, Los Angeles, Calif., assignor to Hartwell Corporation, a corporation of California
Filed Apr. 27, 1960, Ser. No. 24,962
4 Claims. (Cl. 24—211)

This invention relates to fasteners for releasably securing or positioning one member on a second. More particularly, the invention provides an improved, plunger-actuated, expansion-type fastener for detachably securing one member to one or more panel or plate-type members or the like.

Expansion type fasteners of this general character are known in the prior art. They are not, however, easily actuated so that two or more parts may be easily and securely fastened together and as easily unfastened. Moreover, presently known plunger type fasteners are necessarily arranged so that the parts of the fastener must be completely disengaged from each other or nearly so, before being used to fasten members together or before members fastened together may be released.

A fastener according to my invention has a fastener part and an expander part. The fastener part, connected at one end to a first member, has an expander aperture therethrough in which the expander part is movably arranged. The fastener part has an expansible and collapsible portion adjacent the periphery of the expander aperture. This portion extends axially of the fastener away from the first member.

The second member, such as a thin wall or panel section, on which the first member is to be secured, is provided with a receiving aperture for the fastener. The expansible and collapsible portion of the fastener has normal dimensions such that it is freely insertable into the receiving aperture when the first member is positioned. The dimensions are also such that the same portion projects beyond the wall or panel section when it has been inserted in place for fastening.

The expander part or member has axial sections of different diameters arranged for controlling and actuating the expansible portion. For fastening, the expander is depressed or moved axially in the direction of the second member, from the first, so that the ends of the expansible portion bear against a large diameter section of the expander. In this position, the fastener part is expanded to a diameter greater than that of the receiving aperture. The expansible portion cannot be withdrawn and the first member is secured in place.

For releasing, the expansible portion is collapsed to its normal dimensions. The expander is moved reversely until the expansible portion ends bear against a small diameter expander section, whence the fastener can be simply withdrawn from the receiving aperture.

A fastener according to my invention can be provided in many sizes and materials for many purposes. It can be used as a temporary fastening means for holding, for example, two or more sheets or panels in predetermined relation necessary for operations such as machining. It is useful as well as an aligning means for bringing such sheets or panels into a precise predetermined position. It can be permanently installed for use as a latch type fastener for a door or other type of panel which is to be releasably secured. It can be permanently installed in or made part of a bracket type member which is to be releasably attached to a wall or panel surface.

This new fastener is simple to fabricate from inexpensive materials. It is easily installed. It has high resistance to vibration and is rattle-free. It operates quietly and requires no lubrication. Most importantly, my new fastener has good holding ability and its operation is entirely rational, i.e., force exerted on the expander part to expand the fastening part also acts to close the panels or other members upon each other, and force exerted on the operating member to unlock the fastener also acts to separate the panels or members.

These and other features of the invention will be explained in detail in the following description of particular embodiments of the invention. In the description reference is made to the accompanying drawing in which:

FIG. 1 is a side view, partly in section, of the two parts of a plunger-actuated expansion-type fastener, the two parts being shown separated to illustrate fully their construction;

FIG. 2 is a bottom view of the expandable part of the fastener shown in FIG. 1;

FIG. 3 is a side view (partly broken away) of the fastener shown in FIG. 1, in which the manner of mounting, assembling and operating the parts are disclosed; and FIG. 4 is another side elevation (partly broken away) of the fastener shown in FIG. 1 in which the manner of operating the fastener is disclosed.

Figure 6:
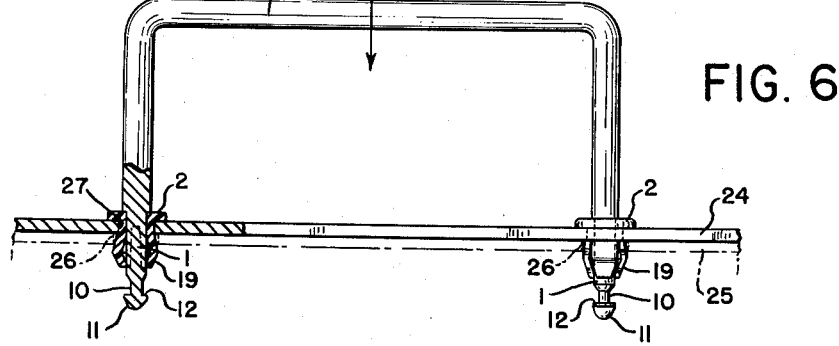
Figure 7:
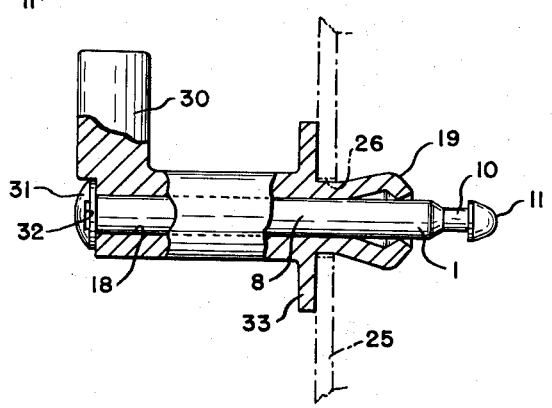

FIG. 6 is an elevation view, partially in section, showing fasteners of the invention permanently installed in a removable member or panel, with a handle for ganged operation of the fasteners and for convenient manipulation of the panel in which they are installed; and FIG. 7 is an elevation view, partially in section, of an alternative embodiment of the invention where the fastener portion is made integral with a hook-type of support bracket, showing the bracket secured in place on a wall or panel surface.

Referring now to FIG. 1 the two parts of my new fastener are shown in an exploded view so that all their details may be readily observed. The plunger or expander part is shown at 1 and the mounting and expandable part is shown at 2. In this particular embodiment both parts 1 and 2 are generally circular in cross-section throughout their lengths. This is readily apparent with respect to the expandable part from an examination of FIG. 2.

The plunger comprises a handle 4 shaped so that it may be conveniently pushed and pulled in the direction of its longitudinal axis of the fastener. To this end the top surface of the handle is made slightly concave, as indicated at 5 to fit the contour of the ball of the thumb. The external contours of the handle 4 are made generally conical, as indicated at 6, so that the handle may be conveniently grasped and pulled with the thumb and fingers. A cylindrical part 8, co-axial with the handle 4, extends from the handle. The diameter and length of this cylindrical part 8 will, in due course, be related to certain dimensions of the expandable part 2.

At the cross section of the plunger where the cylindrical part 8 joins the handle 4 there is a shoulder 7, the external diameter of which is greater than the diameter of cylindrical part 8. At the end of the cylindrical part 8 opposite the handle 4 there is a truncated conical part 9 the diameter of which decreases from its juncture with the cylindrical part 8. The cone angle of the part 9 may conveniently be on the order of 45°, although this is not critical. Extending co-axially from the conical part 9 there is straight cylindrical part 10, the diameter of which is the same as the small diameter of the part 9.

At the end of the plunger opposite the handle there is a hemispherical part 11 the diameter of which is substantially the same as the diameter of the cylindrical part 8, and is accordingly greater than the diameter of the cylindrical part 10. Thus, there is formed an annular shoulder 12 at the juncture between these two parts.

In this particular embodiment the cylindrical part 8 is provided with a series of annular ridges 13 distributed over a part of the length of the body above the juncture of the conical part 9. These ridges have sloping surfaces which form the saw-tooth profile shown in the drawing. In some embodiments, these ridges will be found advantageous, although they will not be necessary in every case. Their function in this embodiment will be described in connection with FIG. 4.

The entire plunger may be made of any suitable material such as plastic, metal, or hardwood and may be conveniently moulded, cast or machine-turned in one piece.

The expansible part 2 is provided with means for mounting it either temporarily or permanently. This particular embodiment of the invention is designed to be mounted in a circular hole in a panel which is thin and flat in the immediate vicinity of the mounting hole, and is provided with a grommet-like head comprising a flat ring-like part 14, the external diameter of which is somewhat greater than the hole in which the part is to be mounted. Depending co-axially from the ring 14 there is a reduced cylindrical part 15, the diameter of which can be substantially the same as, or less than, the diameter of the hole 27 in which the part is to be mounted. In the embodiment shown, the two diameters are substantially the same. This relation results in an annular shoulder 16 at the cross section between the ring 14 and the cylindrical part 15.

There are fixed to and depending from the cylindrical part 15 a plurality of separate fingers the shapes of which may more readily be seen if FIGS. 1 and 2 are considered together. Generally, these fingers taken together form a cylindrical extension which is co-axial with the ring 14 and the cylindrical part 15, but they are separated from each other by longitudinally extending cuts or slots indicated at 20 in FIGS. 1 and 2. In this embodiment the slots are placed at the cardinal points about the axis of the part so that four fingers 19 are formed. The resiliency of the material from which the expandable part 2 may be provided with radially extending ears which plication may make it desirable to form more or less than four such fingers.

The main portions of fingers 19 extend substantially parallel to the axis of the part and the outside diameter along the main portion is made somewhat greater than the diameter of the cylindrical part 15 so that there is formed at the juncture between the fingers and the cylindrical part 15 an annular shoulder 17. The shoulders 16 and 17, separated as they are by the cylindrical part 15, form a mounting means similar to a grommet. As shown, elasticity of the material used permits part 2 to be forced through a hole, smaller in diameter than the outside diameters of either the shoulder 16 or the shoulder 17, so that a panel is received within the annular groove between shoulders and the fastener is held permanently and securely in place.

Other mounting means may be provided. For example, also as for a permanently installed latch, the part 2 may be provided with radially extending ears which may be screwed or riveted to the member on which the part is to be mounted.

Also, for installations where precise aligning of panels or the like is not required or possible, the fastener can be made laterally adjustable. For this purpose, the diameter of cylindrical part 15 is made less than the diameter of mounting aperture 27. When installed, the fastener is movable in the mounting aperture 27.

This feature is advantageous when only approximate pre-positioning of members, such as panels 24 and 25 in FIG. 3, is necessary. The fastener is movable between positions where its longitudinal axis coincides with the axis of the mounting or of the receiving aperture and small amounts of mis-alignment can be accommodated.

The free ends of the fingers 19 terminate in turned-in portions so that the lower end of the part 2 is then generally frustro-conical. The hole 18 through the expandable part 2 is cylindrical and has substantially the same diameter as the diameter of the cylindrical body 8 of the plunger. I have found that it is generally desirable to make the diameter of hole 18 slightly less than the diameter of the body 8 so that there is a moderate frictional contact between the parts when they are assembled. The lower portion of the aperture through the expandable part 2 decreases in diameter over that portion of the length of the fingers which is turned inward toward the axis, and adjacent the bottom end of each finger there is an internal surface 22 which slopes outwardly from the axis. The juncture between the inwardly and outwardly sloping surfaces forms a ridgeline which in this particular embodiment cooperates with the ridges 13 on the body 8 of the plunger or expander part 1. The bottom end of each finger is provided with a radially extending bearing surface 23.

Expansible part 2 as shown is formed of an elastic and resilient material such as any suitable synthetic resin. It can also be formed of flexible metal for other types of installations, as will be explained subsequently. I have found that both the plunger 1 and the expandable part 2 may be advantageously formed of nylon, for it may be easily molded., it may be made highly resilient and elastic, and it resists abrasion and wear remarkably well.

In FIG. 3, I show the expansible part 2 mounted, as described above, in a panel indicated at 24. The expander part is shown inserted into the expansible part. This assembly is accomplished merely by inserting the hemispheric end 11 of the plunger into the grommet-like head of the expansible part 2 and then pushing the plunger. As the end 11 is pushed through it will cause the fingers 19 to expand and when the end 11 passes beyond the lower ends of the fingers they will snap back into their normal or unexpanded position. For this condition the turned-in ends of the fingers are received in the reduced portion of the expander part about the cylindrical part 10. Any attempt to withdraw the plunger from the expandable part without deliberately forcing the fingers out beyond the periphery of the end 11 is resisted by the annular shoulder 12 on the end 11 bearing against the end surfaces 23 on the fingers.

To illustrate the operation of my new fastener suppose that the member 24 in which the expansible fastening and aligning part 2 is mounted is a hinged door panel, and suppose that the member 25 is a fixed wall panel having a receiving aperture 26 therein. With the expander part 1 and the expansible part 2 in the relative positions shown in FIG. 3 the fingers 19 are not expanded and their external diameter is substantially the diameter of the receiving aperture 26. When the door panel is closed on the wall panel the expansible part is inserted into the aperture 26 in the wall panel and the door and wall panels 24, 25 are in overlapped relation as shown in FIGS. 3 and 4. Then the expander part 1 is pushed into the part 2 by means of the handle 4. The internal ridges on the fingers 19 ride up the conical part 9 and onto the cylindrical part 8, thereby forcing the main portions of the fingers 19 to bend outwardly. The result is that the expansible part is now larger in outside diameter than the diameter of the receiving aperture 26 so that the expansible part may not pass back through the wall panel. All this is clearly illustrated in FIG. 4.

As is also shown in FIG. 4 the internal ridges on the fingers engage the external ridges 13 on the expander part 1 and effectively resist displacement of the expander part by vibration and all other actions other than deliberately axially directed force on the handle. However, when it is desired to open the door panel, a moderate pull on the handle 4 will be sufficient to withdraw the expander part 1 so that the fingers ride down the conical part 9 and collapse into the reduced section about the cylindrical part 10. As previously explained the flat ends 23 of the fingers 19 will then bear on the shoulder 12. Further pulling on the handle will not result in additional withdrawal of the expander part; rather, the pulling force is then transferred through the expansible part to the door panel to open it.

Figure 5:
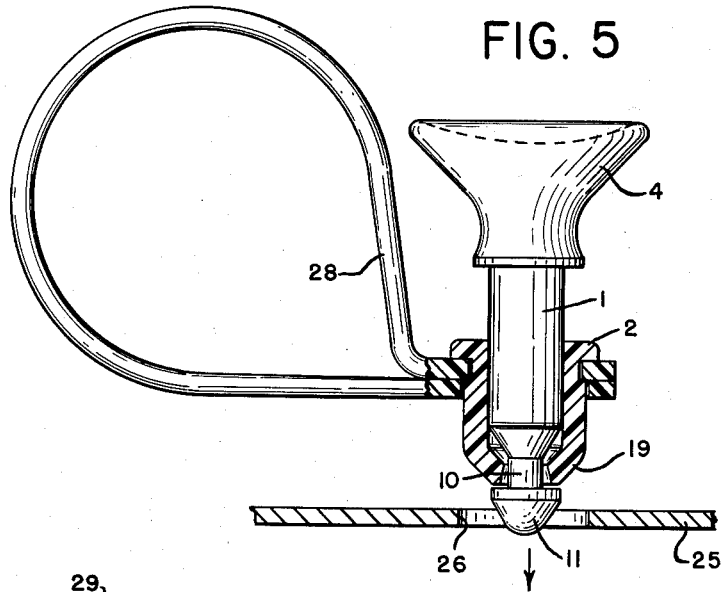
FIG. 5 is an elevation view, partially in section, showing a fastener of my invention permanently installed in a ring-type hanger for attaching the same to a panel.

In FIGS. 5 and 6, other advantageous arrangements for the fastener of my invention are shown. The fasteners shown are essentially the same as described above and salient identical features carry the same identifying numerals.

The fastener of FIG. 5 is permanently installed in a hanger such as may be used for supporting electrical cables on aircraft walls. For this application, hanger member 28, expander part 1, and fastener part 2 are made from insulating plastic materials. As shown, the hanger is positioned over receiving aperture 26 in panel member 25 ready to be secured in place. The hanger is secured simply by inserting the expansible portions 19 through aperture 26 and depressing handle 4. This causes portions 19 to be expanded, as has been explained previously, and the hanger is positioned until removal or repositioning is desired.

In FIG. 6, two fasteners are shown permanently installed in a first panel member 24. A U-type handle 29 is connected to the expander member 1 for gang operation of the fasteners. Such an arrangement may of course be modified to incorporate gang or simultaneous operation of more than two fasteners.

As shown, panel 24 is in place, secured to panel 25. For removal of first member 24, handle 29 is pulled upwardly until the upper shoulders 12 of hemispherical parts 11 bear against the ends of expansible and collapsible portions 19. As has been explained, this action causes the fastening parts to collapse to their normal dimensions whence the fasteners can be withdrawn through receiving apertures 26.

This arrangement has an added advantage in that handle 29, being attached to the fasteners and therefore to first panel 24, can be subsequently used as a convenient grip for manipulation of panel 24 and carrying of the same from place to place.

Also, various means can be used to make handle 29 detachable so that it does not project above the surface of panel 24 when the panel is fastened in place.

An alternative embodiment of my invention is illustrated in FIG. 7. Here the fastening part is made integral with a hook type hanger or bracket 30. Such a bracket may be conveniently used, for example, to support refrigerator shelves.

Expander aperture 18 extends through the bottom of the bracket to accommodate relatively elongated cylindrical portion 8 of the expander member 1. Bracket 30 also comprises, near the inner ends of expansible parts 19, a flange 33 which bears against the surface of the wall or panel member 25 when the bracket is mounted in place (i.e., the position shown).

The outer end of expander 1 comprises a flat head 31. The hook or bracket member 30 is recessed to accommodate head 31, when the bracket is mounted in place, so that in this embodiment the plunger is tamper-proof. Operation of the fastener is the same in all respects as that which has been described previously except for initial removing actuation of the plunger 1. For removal of the bracket, head 31 has a slot 32 for receiving a pry. A tool such as a small screw driver is inserted in the slot 32 and head 31 is pried in the direction away from panel member 25. The expander member 1 can thus be moved to the position where portions 19 collapse and the bracket can be removed.

The tamper-proof head 31 is, of course, highly advantageous for other situations. The fasteners of the invention can be readily provided with this feature when desired. For example, if in FIG. 4, member 24 is an exposed panel in a wall surface, such a head 31 can be substituted for handle 4. Or, such heads 31 can be provided on the fasteners of FIG. 6. Then handle 29 is provided with small hooked arms for engaging slots 32 when removal of the first panel member 24 is desired.

Many other uses and many structural modifications of my new fastener will be apparent. Accordingly, the scope of the invention is not to be limited by the foregoing details. The invention is set forth in the following claims.

I claim:

1. A quick operating latching device for detachably securing together a first member having a fastener mounting aperture therethrough and a second member having a fastener receiving aperture therein, said mounting and receiving apertures being in register when said first and second members are in predetermined lapped relation, which fastener comprises a substantially cylindrical aligning and fastening part of elastic plastic material and having a body provided with means for securing said aligning and fastening part in the mounting aperture of a first member to be secured, said securing means comprising a first annular shoulder member extending radially from said body and a second annular shoulder extending radially from said body at a position axially displaced from said first annular shoulder by a distance substantially equal to the thickness of said first member, a portion of said body between said first and second annular shoulders having an external diameter which is less than the diameter of said mounting aperture so that said fastening part may be freely misaligned within said mounting aperture when mounted in a first member to be secured, said body having an expander aperture extending axially therethrough and having a plurality of elastic fingers fixed to said body portion about the periphery of said expander aperture and extending away from said body portion, said fingers together comprising an expansible portion the normal external dimensions of which are such that said expansible portion is freely insertable into the receiving aperture in a second member to be secured, and the distal ends of said fingers having inwardly extending portions thereon, and an expander member having handle means at one end and a substantially cylindrical portion extending away from said handle adapted to be inserted into said expander aperture and freely reciprocably moved axially of said expander aperture through a predetermined length of said expander member, said expander member comprising an elongated portion, the cross-sectional dimensions throughout the length thereof being substantially equal to the cross-sectional dimensions of said expander aperture and the longitudinal dimension thereof being at least as great as the length of said elastic fingers, said expander member further comprising adjacent the end thereof opposite the handle means an axially extending portion the cross-sectional dimensions of which are substantially less than the cross-sectional dimensions of said elongated portion, whereby, upon simple reciprocation of said expander member in said expander aperture, said fingers may be, when said expander member is fully inserted in said expander aperture, expanded beyond their normal dimensions to prevent withdrawal of said fastening part from the receiving aperture in a second member to be secured and whereby, when said expander member is withdrawn from said expander aperture to a position where said inwardly extending portions on said fingers register with the axially extending portion of reduced dimensions on said expander member, said elastic fingers collapse to their normal external dimensions and said fastening part may be readily withdrawn from said receiving aperture to release a first member from a second member.

2. A quick operating latching device for detachably securing together a first member having a fastener mounting aperture therethrough and a second member having a fastener receiving aperture therein, said mounting and receiving apertures being in register when said first and second members are in predetermined lapped relation, which fastener comprises a substantially cylindrical aligning and fastening part having a body provided with a head at one end and having a diameter substantially larger than the diameter of the mounting aperture in a first member to be secured, said body being further provided with an integral spacer portion extending axially away from said head and having a diameter which is smaller than the diameter of the mounting aperture of a first member to be secured, and said fastening part being further provided with an expansible portion extending axially from and integral with said spacer portion and having a diameter which is greater than the diameter of said mounting aperture in a first member to be secured, said body having an expander aperture extending axially therethrough and the expansible portion being divided into a plurality of elastic fingers by axially formed kerfs extending from the distal end thereof to the spacer portion of said body so that when said body is forcibly inserted in a mounting aperture said elastic fingers collapse inwardly to permit said mounting aperture to pass therealong and be captivated between said head and said expansible portion and thereafter permit said body to be axially misaligned in said mounting aperture, and the distal ends of said fingers having inwardly extending portions thereon, and an expander member having handle means at one end and a substantially cylindrical portion extending away from said handle adapted to be inserted into said expander aperture and freely reciprocably moved axially of said expander aperture through a predetermined length of said expander member, said expander member comprising an elongated portion, the cross-sectional dimensions throughout the length thereof being substantially equal to the cross-sectional dimensions of said expander aperture and the longitudinal dimension thereof being at least as great as the length of said elastic fingers, said expander member further comprising adjacent the end thereof opposite the handle means an axially extending portion the cross-sectional dimensions of which are substantially less than the cross-sectional dimensions of said elongated portion, whereby, upon simple reciprocation of said expander member in said expander aperture, said fingers may be, when said expander member is fully inserted in said expander aperture, expanded beyond their normal dimensions to prevent withdrawal of said fastening part from the receiving aperture in a second member to be secured and whereby, when said expander member is withdrawn from said expander aperture to a position where said inwardly extending portions on said fingers register with the axially extending portion of reduced dimensions on said expander member, said elastic fingers collapse to their normal external dimensions and said fastening part may be readily withdrawn from said receiving aperture to release a first member from a second member.

3. A quick operating latching device for detachably securing together a first member having a fastener mounting aperture therethrough and a second member having a fastener receiving aperture therein, said mounting and receiving apertures being in register when said first and second members are in predetermined lapped relation, which fastener comprises a substantially cylindrical aligning and fastening part of elastic plastic material and having a body provided with means for securing said aligning and fastening part in the mounting aperture of a first member to be secured, said securing means comprising a first annular shoulder member extending radially from said body and a second annular shoulder extending radially from said body at a position axially displaced from said first annular shoulder by a distance substantially equal to the thickness of said first member, a spacer portion integral with said body and between said first and second annular shoulder members so that a first member to be secured and having a mounting aperture therein may be captivated between said shoulders upon insertion of said fastening part into the mounting aperture, said body having an expander aperture extending axially therethrough and having a plurality of elastic fingers fixed to said body portion about the periphery of said expander aperture and extending away from said body portion, said fingers together comprising an expansible portion the normal external dimensions of which are such that said expansible portion is freely insertable into the receiving aperture in a second member to be secured, and the distal ends of said fingers having inwardly extending portions thereon, and an expander member having handle means at one end and a substantially cylindrical portion extending away from said handle adapted to be inserted into said expander aperture and freely reciprocably moved axially of said expander aperture through a predetermined length of said expander member, said expander member comprising an elongated portion, the cross-sectional dimensions throughout the length thereof being substantially equal to the cross-sectional dimensions of said expander aperture and the longitudinal dimension thereof being at least as great as the length of said elastic fingers, said expander member further comprising adjacent the end thereof opposite the handle means an axially extending portion the cross-sectional dimensions of which are substantially less than the cross-sectional dimensions of said elongated portion, whereby, upon simple reciprocation of said expander member in said expander aperture, said fingers may be, when said expander member is fully inserted in said expander aperture, expanded beyond their normal dimensions to prevent withdrawal of said fastening part from the receiving aperture in a second member to be secured and whereby, when said expander member is withdrawn from said expander aperture to a position where said inwardly extending portions on said fingers register with the axially extending portion of reduced dimensions on said expander member, said elastic fingers collapse to their normal external dimensions and said fastening part may be readily withdrawn from said receiving aperture to release a first member from a second member.

4. A latching device according to claim 3 and in which the expander member further comprises a head portion on the distal end of said axially extending portion of reduced dimensions, the diameter of said head portion being greater than the normal diameter of the distal end of said fingers.

References Cited in the file of this patent
UNITED STATES PATENTS

| | | |
|---|---|---|
| 1,169,693 | Swedlund | Jan. 25, 1916 |
| 2,061,629 | Huck | Nov. 24, 1936 |
| 2,336,153 | Ryder | Dec. 7, 1943 |
| 2,616,328 | Kingsmore | Nov. 4, 1952 |
| 2,657,894 | Sklenar | Nov. 3, 1953 |
| 2,737,406 | Brookbank | Mar. 6, 1956 |
| 2,826,110 | Lemelson | Mar. 11, 1958 |
| 2,921,819 | Rifkin | Jan. 19, 1960 |
| 2,926,409 | Perry | Mar. 1, 1960 |
| 2,937,834 | Orenick et al. | May 24, 1960 |
| 2,943,373 | Rapata | July 5, 1960 |
| 2,994,243 | Langstroth | Aug. 1, 1961 |

FOREIGN PATENTS

| | | |
|---|---|---|
| 960,045 | Germany | Mar. 14, 1957 |

UNITED STATES PATENT OFFICE
CERTIFICATE OF CORRECTION

Patent No. 3,116,528　　　　　　　　　　　　January 7, 1964

Lloyd R. Poe

It is hereby certified that error appears in the above numbered patent requiring correction and that the said Letters Patent should read as corrected below.

Column 3, lines 42 and 43, strike out "may be provided with radially extending ears which plication" and insert instead -- is formed and the requirements of the particular application --.

Signed and sealed this 23rd day of June 1964.

(SEAL)
Attest:

ERNEST W. SWIDER
Attesting Officer

EDWARD J. BRENNER
Commissioner of Patents